(12) United States Patent
Hull et al.

(10) Patent No.: US 7,432,440 B2
(45) Date of Patent: Oct. 7, 2008

(54) ELECTRICAL BOX SUPPORT

(75) Inventors: Eric G. Hull, Madison, OH (US);
Charles H. Riedy, Lakewood, OH (US);
Robert M. Gudin, Willoughby, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 80 days.

(21) Appl. No.: 10/680,795

(22) Filed: Oct. 7, 2003

(65) Prior Publication Data

US 2005/0072589 A1    Apr. 7, 2005

(51) Int. Cl.
*H02G 3/08* (2006.01)

(52) U.S. Cl. .............................. 174/50; 174/58; 220/3.2; 220/4.02; 248/906

(58) Field of Classification Search ........................ 174/50, 174/48, 53, 54, 58, 61, 63, 17 R, 480, 481; 220/3.2, 3.3, 3.4, 3.7, 3.9, 4.02, 3.5, 3.6, 220/3.8; 248/560, 200, 903, 906; 435/535; D13/152

See application file for complete search history.

(56) References Cited

U.S. PATENT DOCUMENTS

| | | | |
|---|---|---|---|
| 1,453,017 A | | 4/1923 | Lindelof |
| 1,592,990 A | * | 7/1926 | Raquette et al. ............. 248/906 |
| 1,898,282 A | * | 2/1933 | Almcrantz .................. 248/906 |
| 2,681,164 A | * | 6/1954 | Zoltan ........................ 174/58 |
| 3,730,466 A | * | 5/1973 | Swanquist ................... 248/906 |
| 3,977,640 A | * | 8/1976 | Arnold et al. ................. 174/58 |
| 4,747,506 A | * | 5/1988 | Stuchlik, III ................ 248/906 |
| 4,934,644 A | * | 6/1990 | Nagy et al. .................. 248/906 |
| 4,943,022 A | * | 7/1990 | Rinderer ..................... 248/906 |
| 5,239,132 A | * | 8/1993 | Bartow ........................ 174/58 |
| 5,408,045 A | * | 4/1995 | Jorgensen et al. ............. 174/58 |
| 6,491,270 B1 | * | 12/2002 | Pfaller ........................ 248/906 |
| 6,648,277 B2 | * | 11/2003 | De Leu ....................... 174/58 |

FOREIGN PATENT DOCUMENTS

| | | |
|---|---|---|
| DE | 3423284 A1 | 6/1984 |
| JP | 401256662 A | 10/1989 |
| JP | 5003616 | 1/1993 |
| JP | 5146029 | 6/1993 |
| JP | 5276632 | 10/1993 |
| JP | 8338130 | 12/1996 |

\* cited by examiner

*Primary Examiner*—Angel R Estrada
(74) *Attorney, Agent, or Firm*—Jones Day

(57) ABSTRACT

An electrical box having spring legs for supporting the box within a space between a pair of spaced-apart parallel concrete forms. The legs engage the inside surface of one form and bias the open end of the box against the inside surface of the other form. The legs and the bottom of the box are cooperatively configured to facilitate attachment of the legs to the box. A bendable strap is attached to the box for wrapping around reinforcing bars within the forms. The legs and strap hold the box in position when concrete is poured into the space between the forms. The entire box and support elements remain embedded within the finished concrete wall, and with the open end of the box exposed at an outer surface of the concrete wall.

23 Claims, 10 Drawing Sheets

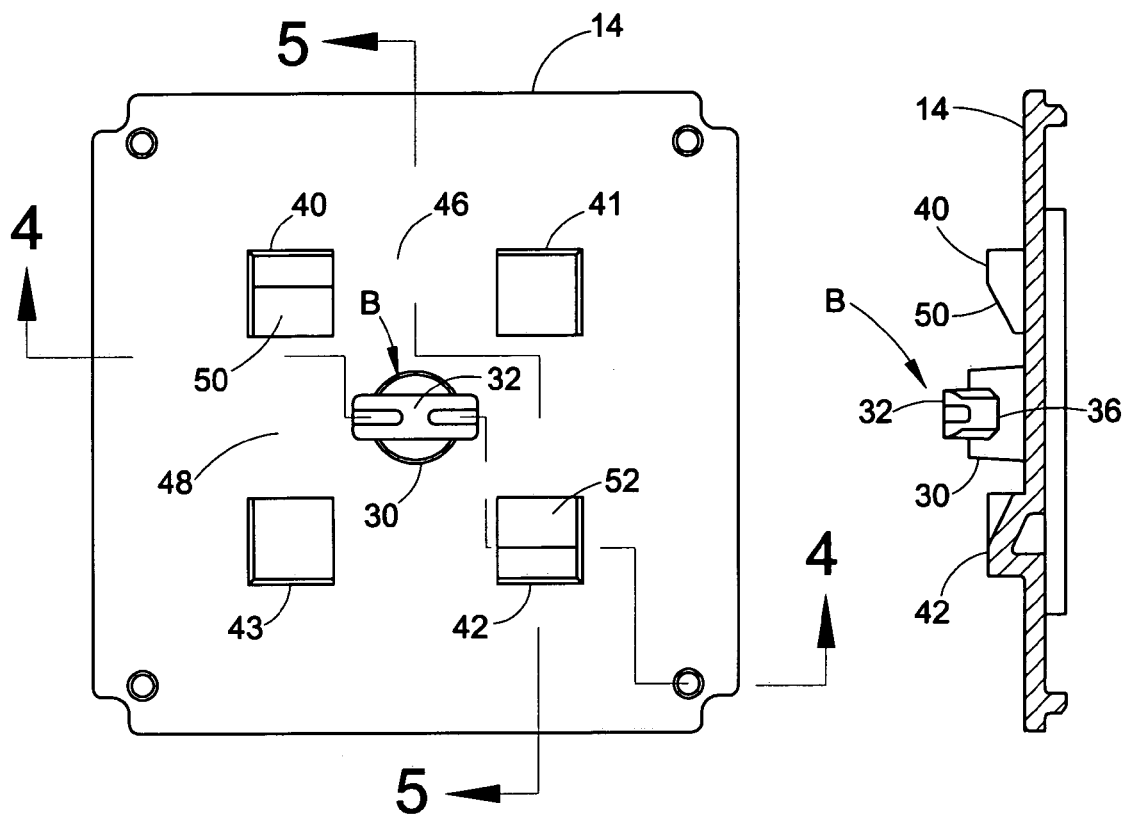
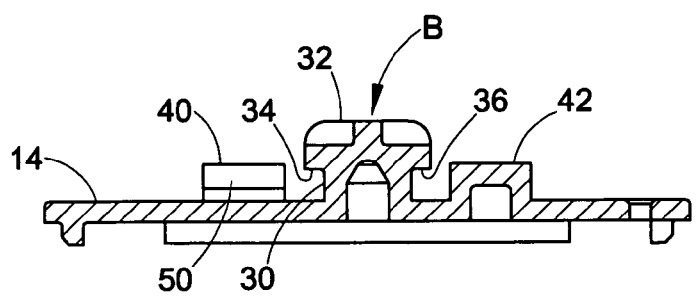
FIG. 3
FIG. 5
FIG. 4

ELECTRICAL BOX SUPPORT

BACKGROUND OF THE INVENTION

This application relates to the art of electrical boxes and, more particularly, to supports for electrical boxes. The invention is particularly applicable to electrical boxes that are known as mud boxes or slab boxes used in poured concrete construction and will be specifically described with reference thereto. However, it will be appreciated that the invention has broader aspects, and that certain features of the invention may be used in other environments and for other purposes.

Electrical mud or slab boxes commonly are supported within a space between a pair of spaced-apart parallel concrete forms. The box is suitably supported in the space between the forms with the box open end in engagement with an inside surface of one of the forms. The space between the forms is filled with concrete and the forms are removed after the concrete has cured. The open end of the box then is accessible on an external surface of the concrete wall.

It is difficult to support the box in the space between the forms in a manner that prevents any movement of the box while the concrete is being poured. It would be desirable to have a support arrangement for the box that is easy to install while providing minimal possibility of box displacement during pouring of the concrete.

SUMMARY OF THE INVENTION

An electrical mud box of the type described is provided with spring legs that engage the inside surface of one form to bias the open end of the box against the inside surface of the opposite form. A bendable strap attached to the box can be wrapped around reinforcing bars within the space between the forms to further secure the box against displacement.

In one arrangement the spring legs are on generally U-shaped spring members that are secured to the box bottom wall. Two of the spring members provide four spring legs that firmly and uniformly bias the open end of the box against the inside surface of a concrete form.

In one arrangement, the box bottom wall has a central external projection to which the spring leg members are attachable. Configuration of the box bottom wall and the spring leg members with cooperating attaching arrangements enables easy assembly of the spring leg members to the box in the field.

The attaching arrangement for the spring leg members may comprise a double keyhole slot formed by a central cylindrical hole having rectangular slots extending outwardly therefrom in opposite directions. A projection of the box bottom wall has a corresponding shape for reception in the double keyhole slot. The projection is undercut so that a spring member is rotatable 90° to lock a spring member to the box by way of the box projection overlying a spring leg member outwardly of the cylindrical attachment hole intermediate the attachment slots.

It is a principal object of the present invention to provide an improved arrangement for supporting an electrical box.

It is another object of the invention to provide an improved support arrangement for supporting an electrical mud box within concrete forms.

It is a further object of the invention to provide a mud box support arrangement that is automatically adjustable to support the box between a wide variety of concrete form spacings.

It is an additional object of the invention to provide an improved mud box support that is easily installed in the field.

BRIEF DESCRIPTION OF THE DRAWING

FIG. 3 is a plan view of the box bottom wall of FIG. 2;

FIG. 4 is a cross-sectional elevational view taken generally on line 4-4 of FIG. 3;

FIG. 5 is a partial cross-sectional elevational view taken generally on line 5-5 of FIG. 3;

DESCRIPTION OF A PREFERRED EMBODIMENT

Figure 1:
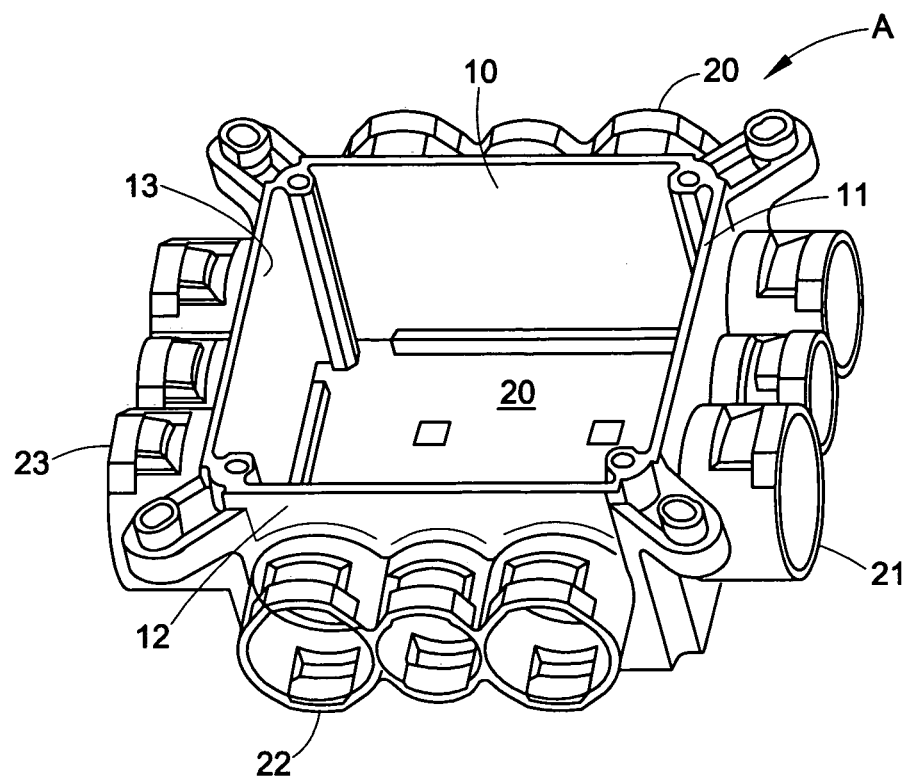
FIG. 1 is a perspective illustration of a mud box in accordance with the present application.
Figure 2:
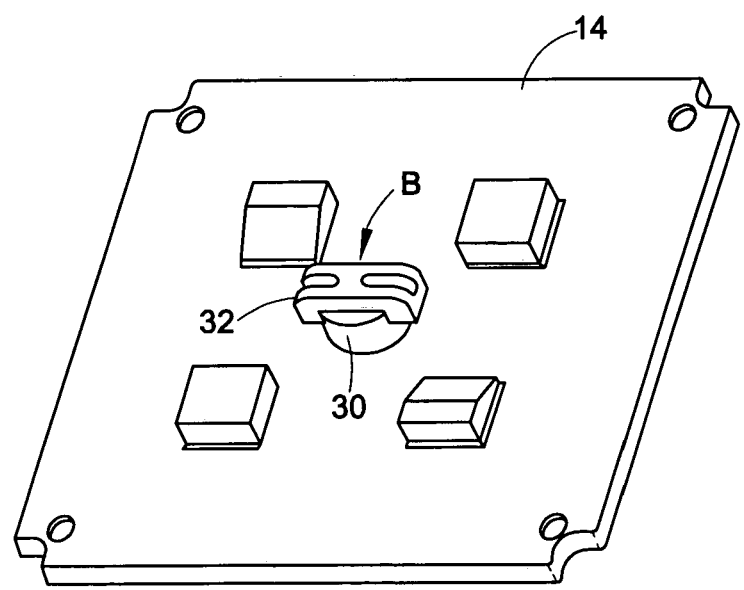
FIG. 2 is a perspective illustration of a bottom wall for the box of FIG. 1.
Figure 7:
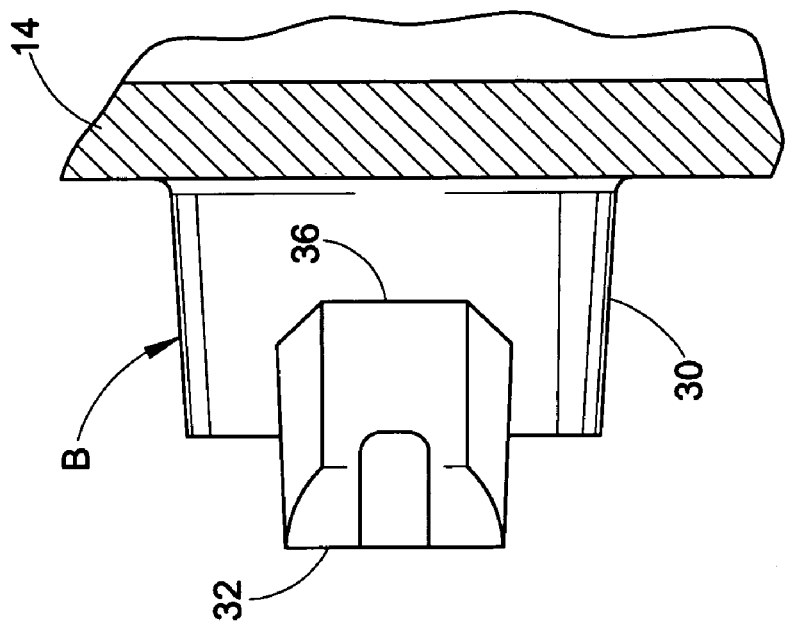
FIG. 7 is a side elevational view of the projection of FIG. 6.
Figure 6:
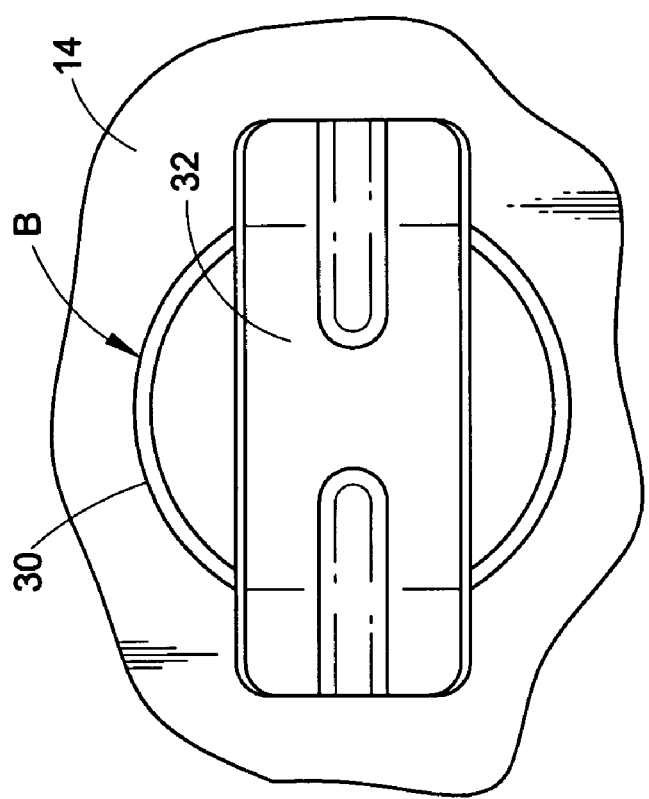
FIG. 6 is an enlarged plan view of an attachment projection on the box bottom wall.

Referring now to the drawing, wherein the showings are for purposes of illustrating a preferred embodiment of the invention only and not for purposes of limiting same, FIG. 1 shows a mud box A molded of plastic material with side walls 10, 11, 12 and 13 and a bottom wall 14. The end of the box opposite from bottom wall 14 is an open end as shown in FIG. 1. Connectors 20, 21, 22 and 23 are provided on the box side walls for attaching conduit, tubing or fittings thereto. Suitable openings or knockouts that are not shown are provided in box walls 10-13 in alignment with connectors 20-23.

As shown in FIGS. 2-5, flat and rectangular box bottom wall 14 includes a centrally located attachment projection B having a central cylindrical projection 30 extending upwardly from the outer surface of bottom wall 14. A transverse projection member 32 on the outer end of cylindrical portion 30 extends outwardly beyond cylindrical portion 30 in opposite directions to provide a generally T-shaped configuration as best shown in FIG. 4. Transverse projection 32 provides downwardly facing shoulders 34, 36 that are spaced above and face toward the outer surface of bottom wall 14. Transverse projection 32 has a width that is much smaller than the diameter of cylindrical portion 30 as shown in FIG. 3.

Abutments 40, 41, 42 and 43 extend upwardly from the outer surface of bottom wall 14 and are equidistantly spaced from one another outwardly of projection B. In effect, abutments 40-43 lie at the corners of a rectangle. Abutments 40, 41 and 42, 43 define a guideway therebetween that extends from top to bottom in FIG. 3 with projection B at the center of the guideway. Projections 40, 43 and 41, 42 define a second guideway therebetween extending from left-to-right in FIG. 3 with projection B at the center of the guideway. The two guideways extend perpendicular to one another. One guideway is generally indicated by number 46 in FIG. 3 and the other guideway is generally indicated by number 48. Transverse projection 32 extends generally parallel to guideway 48 and perpendicular to guideway 46. Abutments 40 and 42 have sloping cam surfaces 50 and 52 that slope downwardly toward guideway 48. Cam surfaces 50, 52 also slope downwardly toward the outer surface of bottom wall 14 in a direction generally perpendicular to the longitudinal axis of transverse attachment projection 32.

Figure 8:
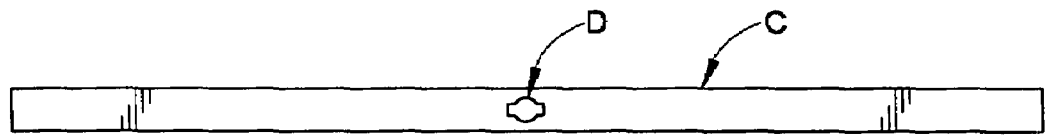
FIG. 8 is a plan view of a locking strap.
Figure 9:
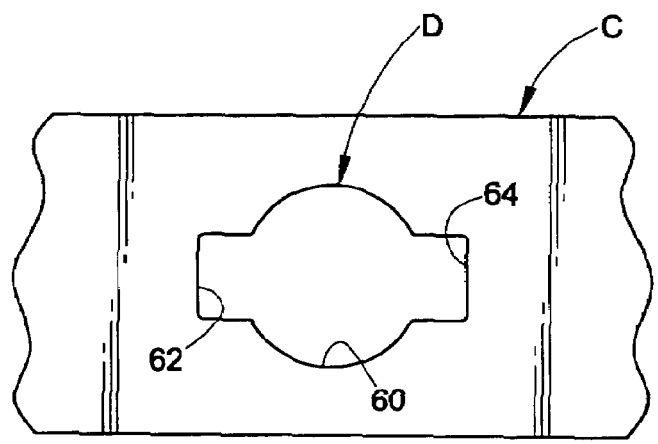
FIG. 9 is an enlarged plan view of an attachment opening on the strap of FIG. 8.

FIGS. 8 and 9 show an elongated flat bendable metal strap C having a centrally located attachment opening D therein. Attachment opening D may be considered to have a double keyhole configuration with a central cylindrical portion 60, and rectangular slots 62 and 64 extending outwardly therefrom in opposite directions. As shown in FIG. 9, the diameter of circular portion 60 is greater than the width of rectangular slots 60, 62 as measured in a direction perpendicular to the longitudinal axis of strap C.

Figure 10:
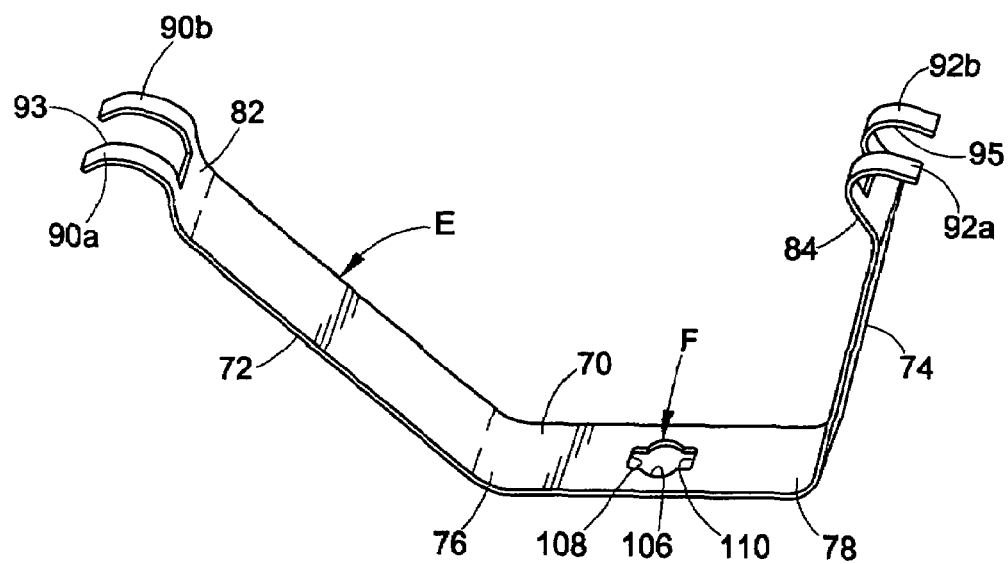
FIG. 10 is a perspective illustration of a spring leg member.
Figure 11:
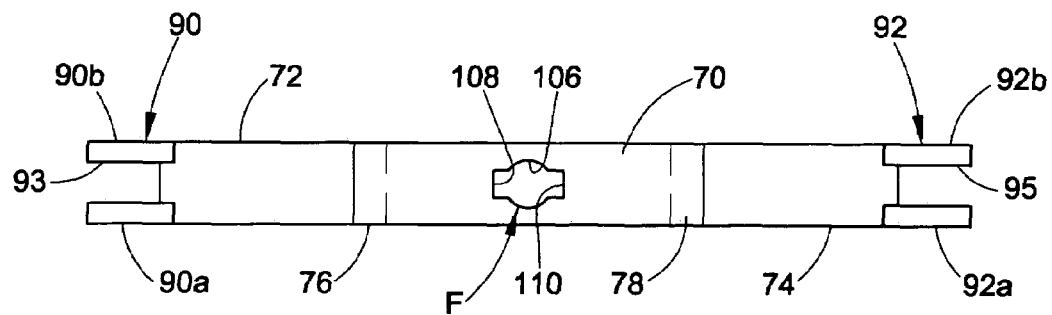
FIG. 11 is a top plan view of the spring leg member of FIG. 10.
Figure 12:
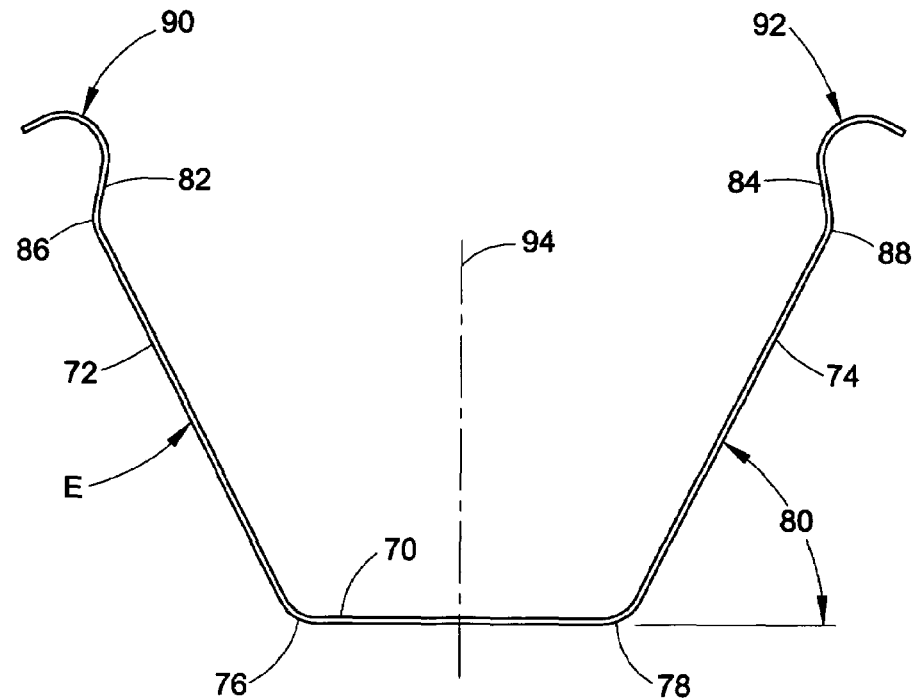
FIG. 12 is a side elevational view of the spring leg member of FIGS. 10 and 11.

FIGS. 10-12 show a generally U-shaped spring leg member E having a flat central attachment portion 70 and opposite spring legs 72, 74 connected with flat attachment portion 70 by curved portions 76, 78. As shown in FIG. 12 for spring leg 74, each spring leg 72, 74 is inclined to the horizontal at an angle 80 at about 64°. Angle 80 may range from about 45° to about 75°, but around 64° has been found to be preferable.

Flat attachment portion 70 extends approximately across the entire width of bottom wall 14, and begins curving upwardly and outwardly at curved portions 76, 78 adjacent the intersection of the bottom wall with a sidewall.

Each spring leg 72, 74 has a spring leg end portion 82, 84 bent inwardly toward one another as at 86 and 88, are reversely curved as indicated at 90, 92 to extend back toward flat attachment portion 70. Thus, legs 72 and 74 are inclined outwardly away from a longitudinal axis 94 in FIG. 12 that extends perpendicular to attachment portion 30 while end portions 82 and 84 are inclined back inwardly toward such axis. In the relaxed position of a spring leg member, end portions 90, 92 may be spaced-apart around 10½ inches whereas box A measures only 4 inches on a side. Therefore, the leg end portions extend outwardly well beyond the box sides. The dimension of a spring leg member from attachment portion 70 to a reversely curved end portion 90 along an axis perpendicular to attachment portion 70 may be around 6¼ inches so that the spring legs extend well rearwardly of box A.

Reversely curved spring leg portions 90, 92 are longitudinally centrally notched as at 93, 95 to divide the end portions into a pair of spaced-apart relatively narrow reversely curved support end portions 90a, 90b and 92a, 92b. Thus, the leg end portions are bifurcated or forked. The width of each reversely curved support end portion 90a, 90b, 92a and 92b is less than one-third of the width of a spring leg 72, 74, and preferably close to around one-fourth of the width of a leg 72, 74. The width of notch 93, 95 then would be around one-third to one-half the width of a spring leg 72, 74.

Each reversely curved support end portion 90a, 90b, 92a or 92b preferably has a width that is not greater than the space between a pair of such support end portions on one spring leg. The curvature of a support end portion is provided so that a curved surface engages the inner surface of the concrete form rather than a terminal end of a spring leg. This shaping and bifurcating of the spring leg end portions significantly reduces the area or footprint of a spring leg end portion that is exposed at the surface of a finished concrete wall.

Spring leg member E preferably is formed of tempered spring steel although it will be appreciated that other materials including plastics may be used for certain purposes. In a most preferred arrangement, spring leg member E is made of spring temper stainless steel so that no rust will bleed from a spring leg at a surface of a concrete wall where an end portion 90 or 92 of a spring leg is exposed. When stainless steel is not used, the reversely curved end portions of the spring legs may be coated with a rubberized or plastisol coating if so desired to prevent rust bleed through.

Attachment portion 70 of spring leg member E has a centrally located attachment opening F that corresponds in size and shape to attachment opening D in strap C. Thus, attachment opening F may be considered to have a double keyhole configuration with a central cylindrical portion 106 having centrally located rectangular slots 108 and 110 extending outwardly therefrom in opposite directions. The width of rectangular slots 108 and 110 is much smaller than diameter of central cylindrical portion 106. In the arrangement shown and described, bottom wall 14 is a separate member that is attached to the remainder of the box with screws or other suitable fasteners. However, it will be appreciated that the wall of the box could be integrally formed with the remainder thereof.

Figure 13:
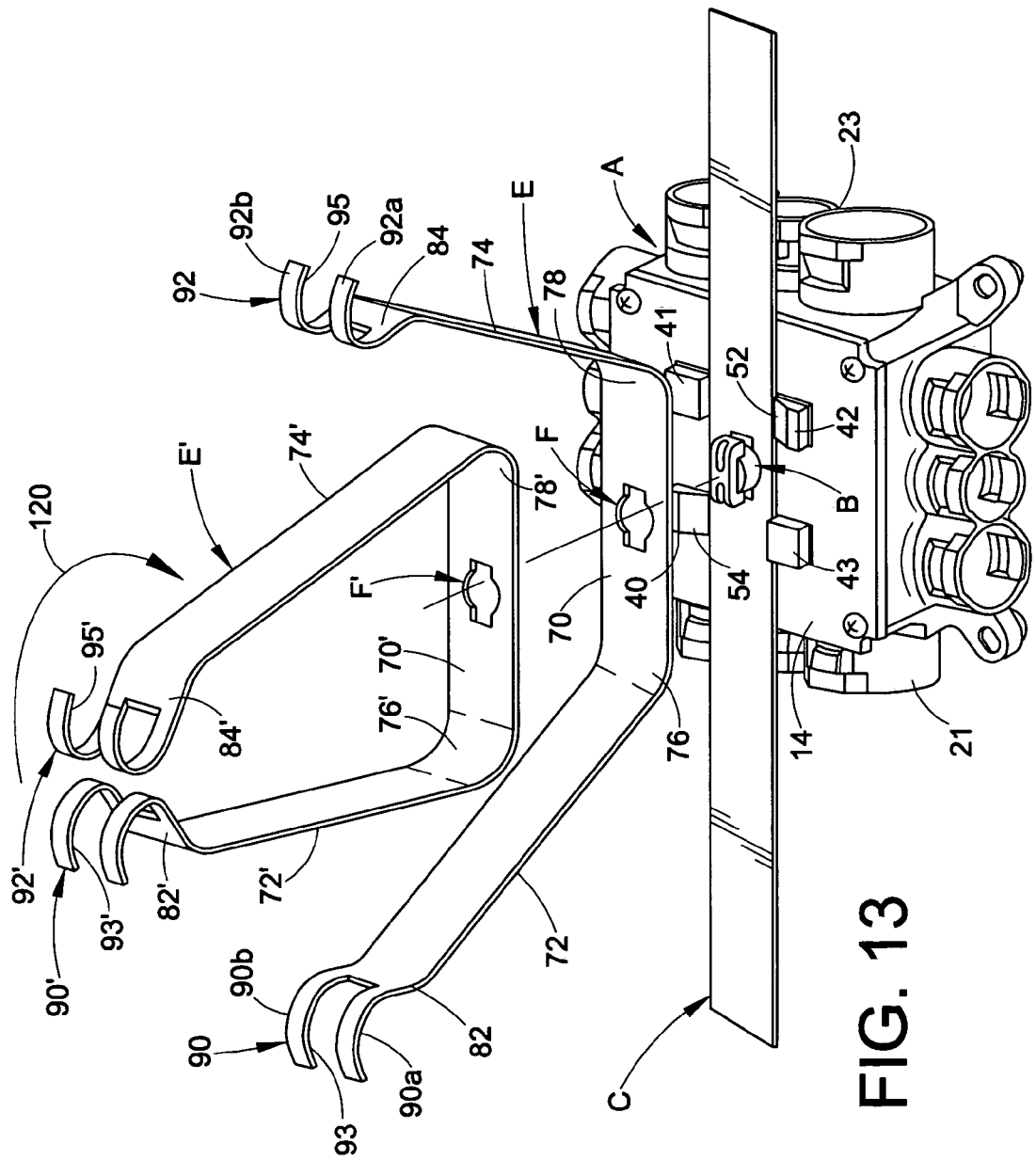
FIG. 13 is a perspective illustration showing how the support legs of the present application are attached to a mud box.

Attachment openings D in strap C and F in spring leg opening E are sized and shaped for close reception of box attachment projection B therethrough. The box support arrangement is attached to a box as shown in FIG. 13. Attachment projection B is extended through the attachment opening D in a flat strap C, and with strap C closely received in the left-to-right guideway that is formed between abutments 40, 43 and 41, 42. The abutments then prevent rotation of strap C relative to box A. Next, a spring leg member E is positioned with attachment projection B extending through attachment opening F. Flat attachment portion 70 and parts of curved portion 76, 78 are then received in the left-to-right guideway between abutments 40, 43 and 41, 42 on top of strap C. Next, another spring leg member E' is positioned with attachment projection B extending through attachment opening F'. The thickness of strap C, attachment portion 70 and attachment portion 70' is such that all three are received in the space between the outer surface of bottom wall 14 and shoulders 34, 36 on attachment projection B in FIG. 4.

Spring leg members 72', 74' are bent toward one another to the configuration shown in FIG. 13 and spring leg member E' is rotated clockwise as indicated by arrow 120. Although a generally flat configuration is shown for attaching portion 70' in FIG. 13, it will be recognized that attaching portion 70' actually assumes a shallow generally U-shaped curvature when legs 72', 74' are bent toward one another. Attachment portion 70' then engages cam surfaces 52, 54 on abutments 40, 42 for permitting clockwise rotation of spring leg member E' 90° until attachment portion 70' is received within the top-to-bottom guideway between abutments 40, 41 and 42, 43. The spring leg member E' then is released, and abutments 40-43 prevent rotation of all three members C, E and E'.

Figure 14:
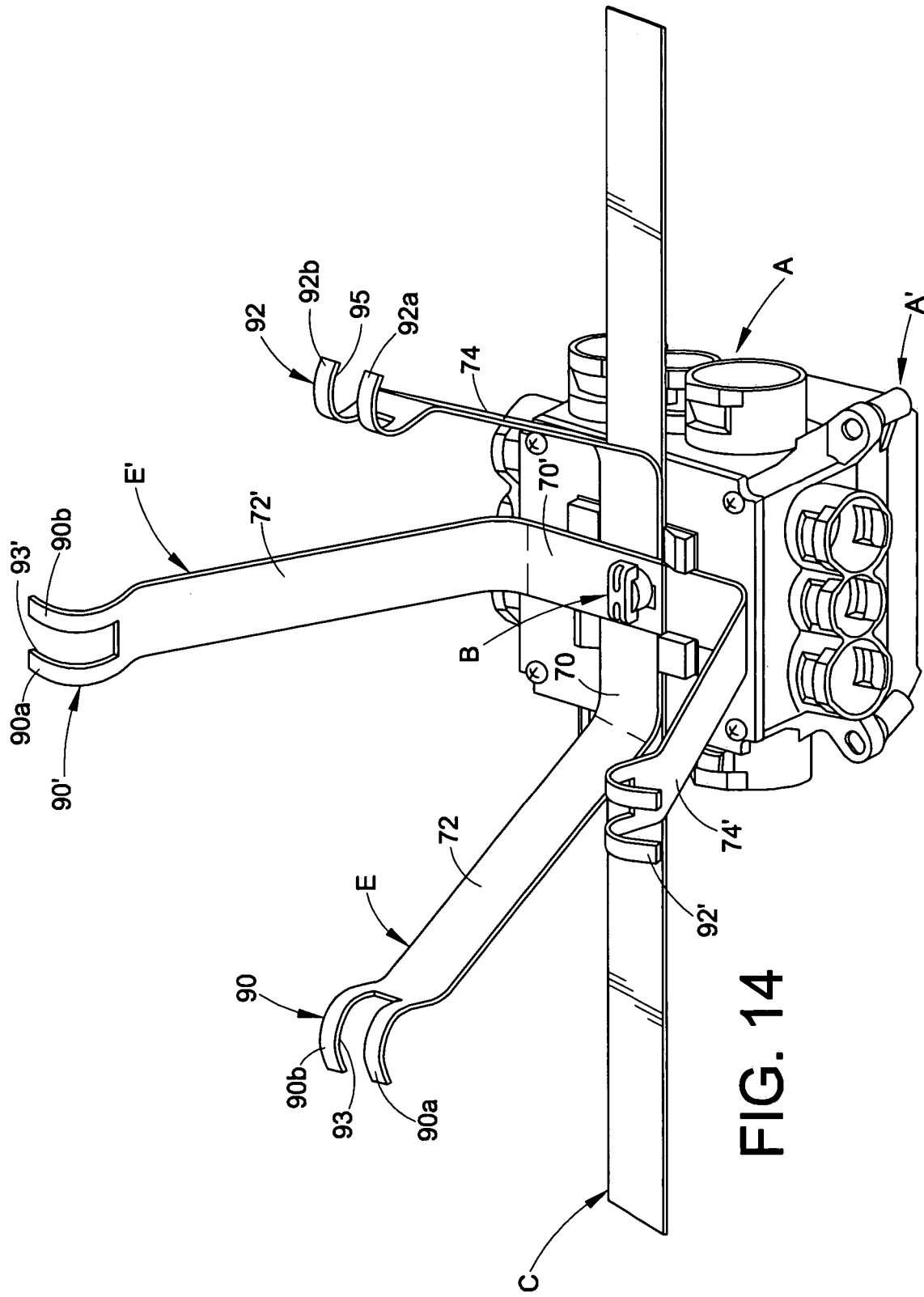
FIG. 14 is a perspective illustration showing a mud box having the support arrangement of the present application attached thereto.
Figure 15:
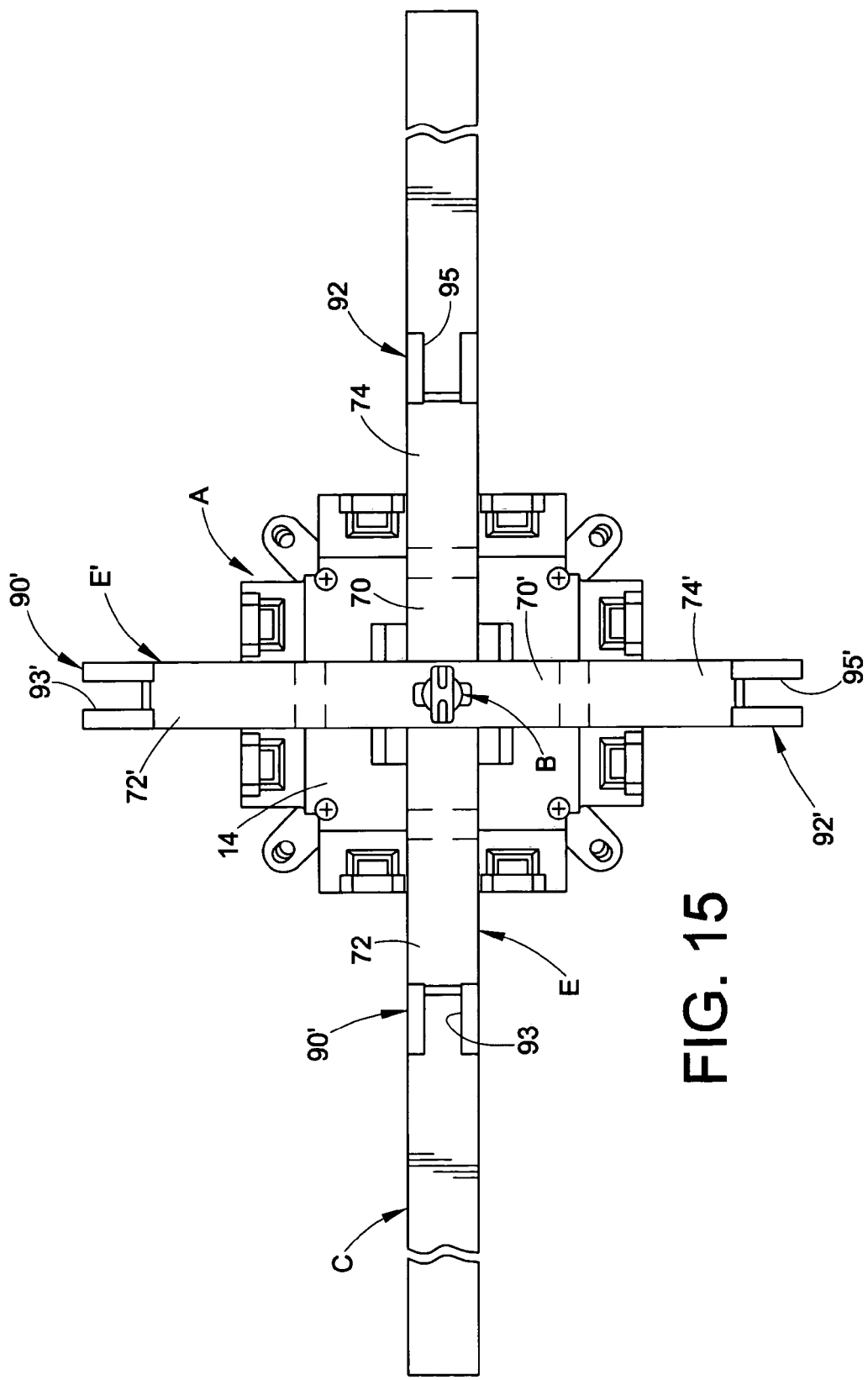
FIG. 15 is a plan view of a mud box having the support arrangement of the present application attached thereto.

When spring leg member E' is rotated 90° clockwise, attachment projection shoulders 34, 36 of FIG. 4 extend outwardly beyond cylindrical hole 60' at locations midway between opposite slots 108', 110' to prevent removal of spring leg member E' from attachment projection B. This also holds strap C and spring leg member E on the box. The final assembly is illustrated in FIGS. 14 and 15.

Configuring attachment projection with a relatively large diameter cylindrical portion 30 provides very high strength and minimizes the possibility that the attachment projection will be broken off from the box bottom wall. At the same time, minimizing the width of transverse projection 32 enables the use of smaller rectangular openings for attachment openings D and F in strap C and spring leg member E so that the central attachment portion of the strap or spring leg member is not unduly weakened by the attachment opening.

Although the spring legs could be attached to the box in other ways and in other locations, the central attachment location insures that substantially uniform pressure will be applied for holding the periphery of the box open end against the inside surface of a concrete form.

Figure 16:
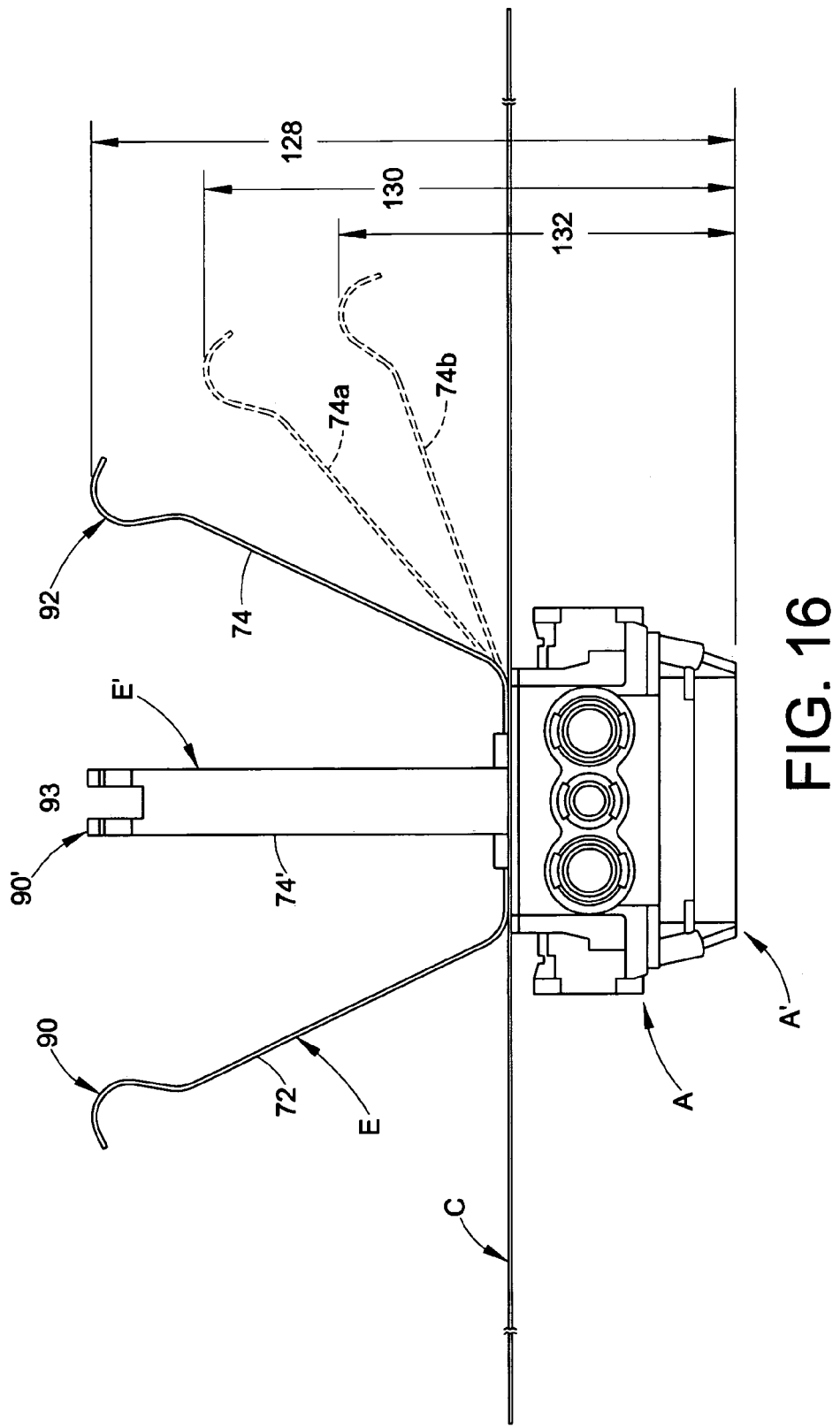
FIG. 16 is a side elevational view of a mud box having the support arrangement of the present application attached thereto and showing the working range of the spring legs.

FIG. 16 shows a typical working range for the spring legs by illustrating leg 74 in dotted line positions 74*a* and 74*b*. From the open end of an adapter A' on box A to the reversely curved end 92 of leg 74, the free length 128 is 9½ inches. The length 130 is 8 inches and the length 132 is 6 inches. Thus, the support arrangement may be used for supporting a box between concrete forms having form inner surfaces that are spaced anywhere from about 6 inches to about 8 inches. Obviously, the spring leg members may be made in other sizes, shapes and stiffnesses for supporting boxes in much wider range of spaces.

Figure 17:
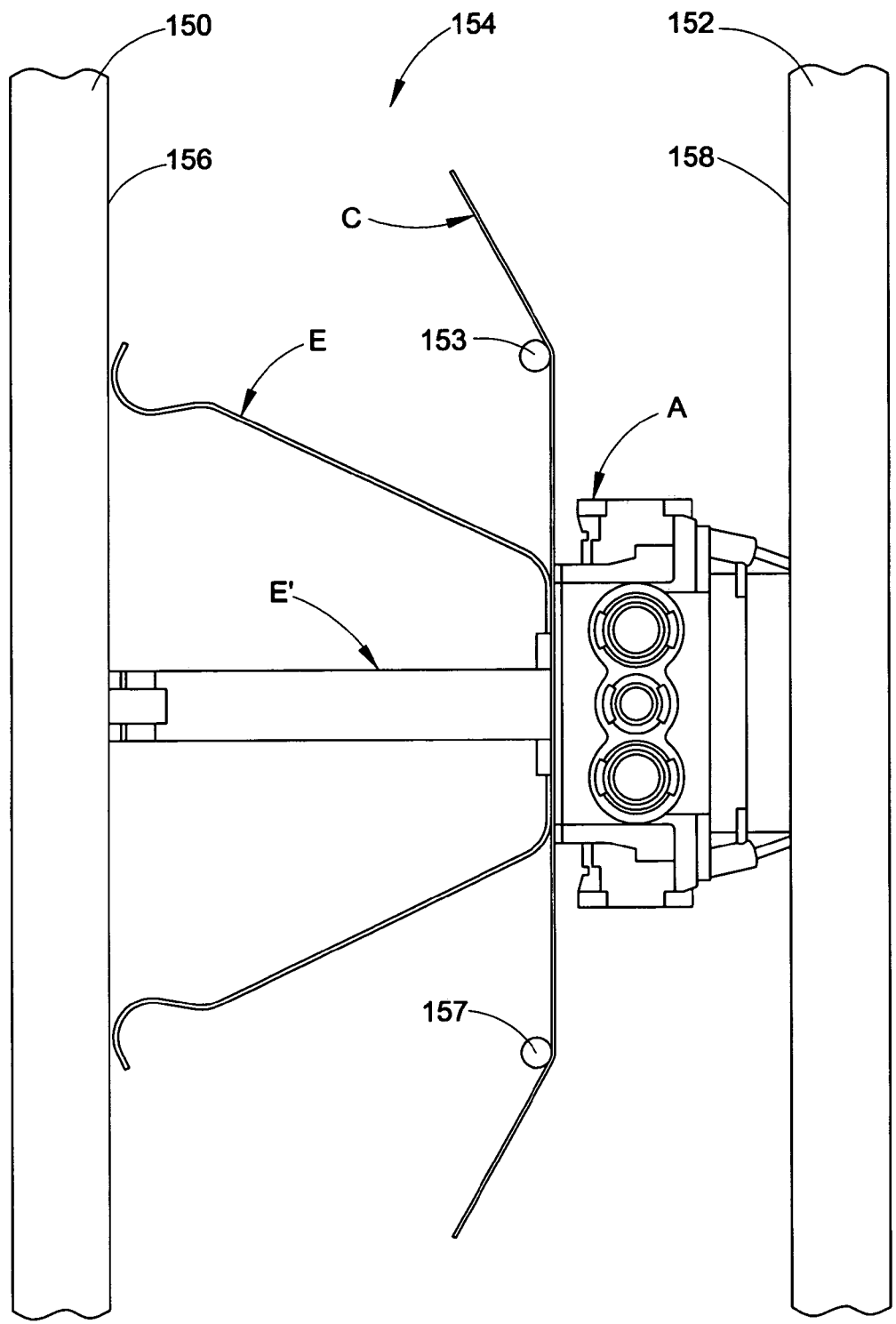
FIG. 17 is a side elevational view showing a mud box in accordance with the present application supported between a pair of spaced-apart parallel concrete forms.

FIG. 17 shows a pair of spaced-apart parallel concrete forms 150, 152 having a space 154 therebetween and form inner surfaces 156, 158. A box and support assembly are positioned within space 154 with the open end of box A engaging inner form surface 158 and with the end portions of the four legs on spring members E, E' engaging form inner surface 156 for biasing the box open end against form inner surface 158. Strap C may be bent around reinforcing bars 153, 157 that typically are provided within space 154 to further prevent any movement of box A from its desired position. After space 154 has been filled with concrete that is allowed to cure, forms 150, 152 are stripped away, and the box and its support assembly remain within the concrete wall. The open end of the box is exposed at an outer surface of the concrete wall.

Although the invention has been shown and described with reference to a representative embodiment, it is obvious that alterations and modifications will occur to others skilled in the art upon the reading and understanding of this application. Therefore, it is to be understood that the invention may be practiced otherwise than as specifically described herein while remaining within the scope of the claims.

We claim:

1. A mud box having an open end, a bottom wall opposite from said open end, and a peripheral sidewall;
    a plurality of resilient spring legs attached to said bottom wall;
    said legs extending in a direction away from said bottom wall and having reversely curved free end portions engageable with one form surface for biasing said box in a direction to engage said box open end with an opposite form surface; the distance between the form surfaces being less than the distance from the box open end to the reversel curved end portions so that the spring legs are under bending stress when the box is positioned between the form surfaces; and
    said free end portions being spaced-apart a distance greater than the maximum distance across said peripheral sidewall so that the free end portions extend outwardly beyond the peripheral sidewall.

2. A mud box molded of plastic material, said box having a bottom wall and an open end opposite from said bottom wall, said bottom wall having an external surface, and a projection molded integrally with said bottom wall on said external surface thereof for attaching support legs to said box, said projection being centrally located on said bottom wall and extending outwardly from said external surface thereof said projection having a central cylindrical portion and a transverse projection portion that is spaced outwardly from said bottom wall external surface, said projection having a length in one direction perpendicular to said cylindrical portion that is greater than its width in a second direction perpendicular to said one direction.

3. The box of claim 2 including a generally U-shaped spring member having a central attachment portion with an attachment opening configured for receiving said attachment projection therethrough, said transverse projection extending outwardly of said attachment opening to engage portions of said attachment portion around said attachment opening and retain said spring leg member on said box.

4. A support kit for attachment to an electrical mud box, said kit including a pair of generally U-shaped spring leg members of a spring material that returns to its original configuration when deflected,
    each spring leg member having a central attachment portion with an attachment opening therethrough, and each spring leg member having a pair of legs diverging outwardly from said attachment portion and terminating in reversely curved leg end portions that are spaced-apart a distance greater than the length of said central attachment portion.

5. The kit of claim 4 wherein said attachment portion is generally flat and said attachment opening is elongated along the length of said attachment portion.

6. The kit of claim 4 including at least one flat bendable strap having a central attachment opening therethrough.

7. A mud box having an open end and a bottom wall opposite from said open end, said bottom wall having an external attachment projection, a plurality of abutments on said bottom wall spaced outwardly from said projection and forming abutment guideways therebetween, a plurality of resilient spring legs having attachment portions that are received in said abutment guideways and have attachment openings received over said attachment projection to attach said spring legs to said box, said spring legs having free end portions engageable with one form surface for biasing said box in a direction to engage said box open end with an opposite form surface.

8. The box of claim 7 wherein at least two of said abutments have cam surfaces engageable by at least one of said attachment portions of said spring legs to cam said one attachment portion past said two abutments when said one attachment portion is placed over said projection and rotated 90°.

9. An apparatus comprising:
    a pair of spaced-apart parallel concrete forms having opposite form surfaces;
    a mud box having an open end;
    a plurality of resilient spring legs attached to said box;
    said legs having free end portions engageable with one form surface for biasing said box in a direction to engage said box open end with the opposite form surface;
    the distance between the form surfaces being less than the distance from the box open end to the free end portions of the spring legs so that the spring legs are under bending stress when the box is positioned between the form surfaces with the box open end engaging the opposite form surface and the spring leg free end portion engaging the one form surface; and
    at least one elongated bendable strap attached to said box for attachment to reinforcement rods between spaced forms.

10. A mud box having an open end, a plurality of resilient spring legs attached to said box, said legs having free end portions engageable with one form surface for biasing said box in a direction to engage said box open end with an opposite form surface, each spring leg having a reversely curved bifurcated end portion to provide a pair of spaced-apart reversely curved support end portions each of which has a width that is not greater than the space between them.

11. A mud box having a bottom wall and an open end opposite from said bottom wall, said bottom wall having an external surface, a centrally located attachment projection integrally formed on said external surface and extending outwardly therefrom for attaching support legs to said box, and a plurality of abutments on said external surface of said bottom wall spaced outwardly from said attachment projection and forming abutment guideways that extend perpendicular to one another past said attachment projection.

12. The box of claim 11 wherein at least two of said abutments have cam surfaces that slope downwardly toward one of said guideways.

13. A support kit for attachment to an electrical mud box, said kit including a pair of generally U-shaped spring leg members and a flat bendable strap, each spring leg member having a central attachment portion with an attachment opening therethrough, and said strap having a central attachment opening therethrough.

14. The kit of claim 13 wherein said attachment opening in each of said spring members corresponds in size and shape to the size and shape of said attachment opening in said strap.

15. An electrical box molded of plastic material, said box having a bottom wall with an external surface, a centrally located projection molded integrally with said bottom wall and extending outwardly from said external surface thereof, at least one flat bendable metal strap having an opening therethrough, said projection and said opening being configured for reception of said projection through said opening in an alignment orientation of said projection and opening, and said projection and opening being configured for preventing movement of said projection through said opening when said strap and projection are rotated out of said alignment orientation with said projection extending through said opening.

16. The box of claim 15 including a pair of flat bendable straps extending perpendicular to one another.

17. The box of claim 15 wherein said opening has the general configuration of a double keyhole and said projection is configured for close reception therethrough.

18. An electrical box molded of plastic material, said box having a bottom wail with an external surface, a pair of elongated flat bendable metal straps, said external surface and said metal straps being configured for attachment of said straps to said bottom wall with said straps extending generally perpendicular to one another in overlying relationship.

19. An electrical box of plastic material, said box having a bottom wall with an external surface, a projection extending outwardly from said external surface, said projection having an enlarged head spaced outwardly from said external surface, a pair of elongated flat bendable metal straps having openings therethrough, said openings being configured for receiving said enlarged head therethrough, said enlarged head and at least one of said openings on at least one of said straps being configured to provide reception of said enlarged head through said one opening and to prevent withdrawal of said head from said opening after rotating said one strap about said projection.

20. The box of claim 19 wherein said straps support said box between a pair of spaced-apart concrete forms that have inner form surfaces spaced-apart between 6-8 inches, said box having an open end and said straps supporting said box between said forms with said open end positioned closely adjacent to or in engagement with one of said form inner surfaces.

21. A support kit for attachment to an electrical mud box;
said kit including a pair of generally U-shaped spring leg members;
each spring leg member having a central attachment portion with an attachment opening therethrough;
each spring leg member having a pair of legs diverging outwardly from said attachment portion and terminating in leg end portions that are spaced-apart a distance greater than the length of said central attachment portion;
a flat bendable strap having a central attachment opening therethrough; and,
said attachment opening in each of said spring members corresponding in size and shape to the size and shape of said attachment opening in said strap.

22. A mud box having an open end;
a plurality of resilient spring legs attached to said box;
said legs having free end portions engageable with one form surface for biasing said box in a direction to engage said box open end with an opposite form surface;
said spring legs being defined by a pair of spring members;
each spring member having a central attachment portion with a pair of spring legs extending therefrom;
said attachment portions being attached to said box in perpendicular relationship to one another to provide four spaced-apart spring legs extending outwardly from said box;
a box projection having an enlarged head;
said attachment portions having openings for receiving said head; and,
said head and said opening in at least one of said attachment portions being shaped to provide reception of said head through said opening and to prevent withdrawal of said head from said opening after said one attachment portion in rotated 90°.

23. An electrical box molded of plastic material, said box having a bottom wall with an external surface, a pair of elongated flat bendable metal straps, said external surface and said metal straps being configured for attachment of said straps to said bottom wall with said straps extending generally perpendicular to one another in overlying relationship;
wherein said external surface has a projection thereon and said straps have openings through which said projection is receivable, said straps being positionable in overlying aligned inner and outer relationship for reception of said projection through said strap openings, and said outer strap being rotatable 90° relative to said inner strap to move said opening in said outer strap out of aligned relationship with said projection so that said projection no longer is movable through said opening in said outer strap to thereby hold said pair of straps to said bottom wall.

* * * * *

UNITED STATES PATENT AND TRADEMARK OFFICE
CERTIFICATE OF CORRECTION

PATENT NO. : 7,432,440 B2 Page 1 of 1
APPLICATION NO. : 10/680795
DATED : October 7, 2008
INVENTOR(S) : Hull et al.

It is certified that error appears in the above-identified patent and that said Letters Patent is hereby corrected as shown below:

Column 5, line 55, change "reversel" to -- reversely --.

Column 6, line 1, insert a semicolon after the word "thereof".

Column 7, line 46, change "wail" to -- wall --.

Column 8, line 43, change "in" to -- is --.

Signed and Sealed this

Ninth Day of December, 2008

JON W. DUDAS
*Director of the United States Patent and Trademark Office*